E. E. CLEMENT.
ELECTRIC CLOCK.
APPLICATION FILED APR. 18, 1910.

1,096,779.

Patented May 12, 1914.
8 SHEETS—SHEET 1.

Witnesses

Inventor
Edward E. Clement

E. E. CLEMENT.
ELECTRIC CLOCK.
APPLICATION FILED APR. 18, 1910.

1,096,779.

Patented May 12, 1914.
8 SHEETS—SHEET 3.

Inventor
Edward E. Clement

Witnesses
H. Löwenstein.
James H. Marr

E. E. CLEMENT.
ELECTRIC CLOCK.
APPLICATION FILED APR. 18, 1910.

1,096,779.

Patented May 12, 1914.
8 SHEETS—SHEET 7.

Fig. 13.b

Witnesses
Inventor

E. E. CLEMENT.
ELECTRIC CLOCK.
APPLICATION FILED APR. 18, 1910.

1,096,779.

Patented May 12, 1914.
8 SHEETS—SHEET 8.

Fig. 14.

UNITED STATES PATENT OFFICE.

EDWARD E. CLEMENT, OF WASHINGTON, DISTRICT OF COLUMBIA.

ELECTRIC CLOCK.

1,096,779.  Specification of Letters Patent.  Patented May 12, 1914.

Application filed April 18, 1910. Serial No. 556,213.

*To all whom it may concern:*

Be it known that I, EDWARD E. CLEMENT, a citizen of the United States, residing at Washington, in the District of Columbia, have invented certain new and useful Improvements in Electric Clocks, of which the following is a specification, reference being had therein to the accompanying drawing.

My invention relates to electric clocks and is in the nature of an improvement on a previous invention for which Letters Patent No. 920,024, were granted to me April 27, 1909.

The objects of the present invention are (1) to provide a simple and effective chronometer movement for controlling an illuminated or electric light clock dial; (2) to arrange the clock dial so that a large number of indications are possible with a minimum number of lamps; and (3) to simplify and improve the apparatus and circuits.

Briefly stated, I accomplish the first object by reducing the chronometer movement to a single element, i. e., an electromagnetically actuated standard pendulum, which regulates the action of electromagnetically driven switches controlling the lamps. I attain my second object by providing sixty radial sets of lamps, corresponding to the sixty minutes on the dial, so that I can have a full indication each minute; but each radial set is divided into hour and minute lamps, the entire set being lighted for a minute hand indication, but only a portion of the set for the hour hand indication. This is in consonance with the usual arrangement of clock hands, of which the minute hand is always the longer. I attain my third object by using a simple form of mechanically driven step by step switch having a comparatively small number of contacts. Two of these switches are used for lamps of each order, all the lamps being divided into groups, and differentiation being effected by making combinations of the group wires as described in my Letters Patent aforesaid. In the present case I connect the wires of one group to one switch and the wires of another group to another switch, and the two switches are actuated so as to produce all the combinations of the different wires in their respective sets, as required to give the successive time indications. In order to show seconds, minutes, and hours, three sets of lamps are required with three pairs of switches. If we call the seconds pair $a$, the minutes pair $b$ and the hours pair $c$, then the order of operation would be as follows. Each complete rotation of $a^1$ produces one step of $a^2$; each complete rotation of $a^2$ produces one step of $b^1$; each complete rotation of $b^1$ produces one step of $b^2$; each complete rotation of $b^1$ also produces one step of $c^1$ and finally each complete rotation of $c^1$ produces one step of $c^2$.

My invention is illustrated in the accompanying drawings in which—

Figure 1 is a face view of a dial on a clock on which there are no hands or other mechanical moving parts, all the indications being given by radial sets of incandescent lamps, and Fig. 1$^a$ is a detail thereof. Figs. 12$^a$ and 12$^b$ taken together, constitute a complete diagram of the circuits of the pendulum, the seconds switches and the corresponding seconds lamps on the dial. Figs. 13$^a$ and 13$^b$ when taken together, constitute a complete diagram of the minutes and hours switches and their corresponding lamps.

Figures 1, 1A:
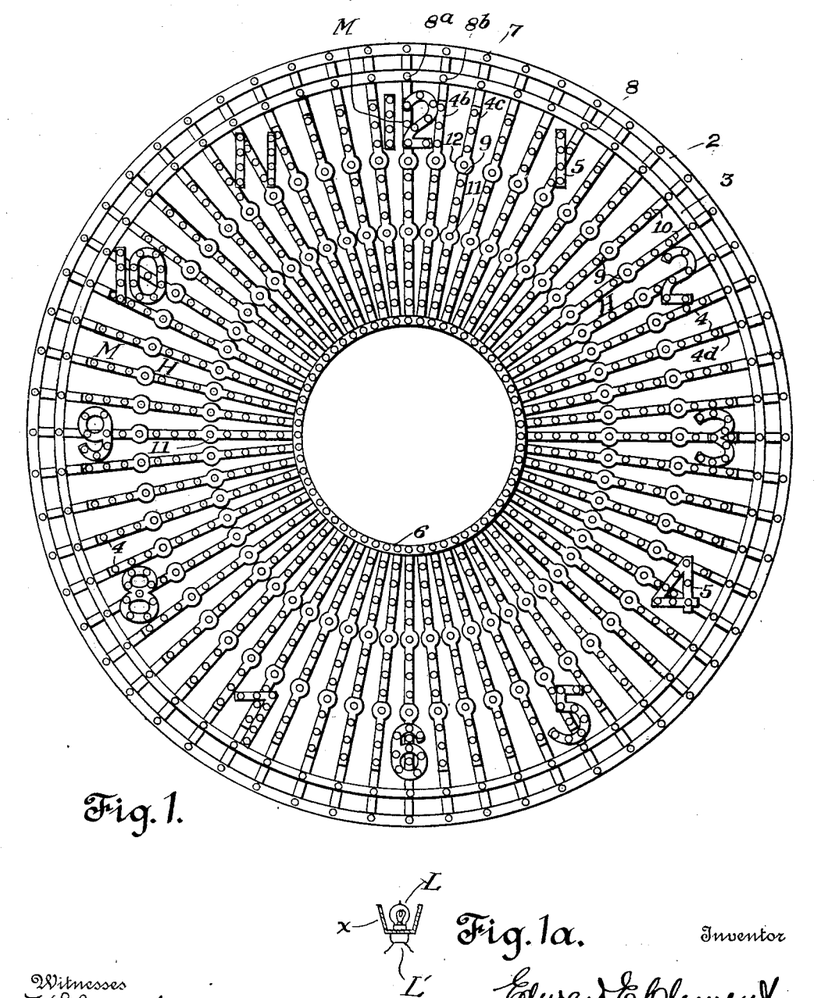

Referring to the drawings, Fig. 1 is a face view of the dial. This may conveniently be constructed in a number of ways, some of which will be indicated. The first way is to form a circular base 1 of any suitable material and upon this mount shallow troughs 2, 3, 4, 5, 6, containing rows of incandescent electric lights. Another way is to omit the base and form a rigid frame of the troughs or metal channels themselves, consisting of the inner ring 6, the outer rings 2 and 3, and the radial or spoke members 4, upon which the numerals 5 are secured. I prefer the second method of construction.

The outer ring 2 contains sixty lamps designated by the numeral 7, which are supposed to be fed simultaneously from a closed circuit, so that they burn continuously, indicating minute or seconds divisions on the dial. In order to differentiate these lamps from the time indicating lamps, they may be of a distinctive color such for example as red. The ring 3 in this design contains the seconds lamps 8 which are lighted one at a time in succession at intervals of one second. The radial troughs 4 contain the hour and minute lamps, and the construction of these troughs is peculiar in order to permit of a double use of the same radial set of lamps for the sake of economy. Thus the lamps in each radial trough extending from the ring 6 to the point 9, where a transverse partition is set in the trough, indicate the hour, while this same set of lamps taken with the additional lamps extending from the point 9 to the point 10 at the end of the trough, indicate the minute. At the points of coincidence of hour and minute only one set of these lamps will be lighted extending from the ring 6 to the point 10, but this combination can only last during a maximum period of one minute, at the expiration of which the next succeeding complete row of lamps will be lighted while the inner set of hour lamps remains glowing. In order to produce an effect on the eye similar to that of hour and minute hands of an ordinary clock, I make enlargements 11 and 12 in the radial troughs, the latter occurring just outside of the transverse partition 9. It will be found that this arrangement approximates very closely to that of ordinary clock or watch hands, and is quite sufficient to render reading easy in the present case. The manner in which the lamps are mounted in these several metal troughs 2, 3, 4, 5 and 6, is indicated in Fig. 1$^a$ which is a sectional view showing the lamp L, the trough X (which may be any one of the numbered troughs) and the lamp socket L'. Where a screw base is employed, the lamp and its socket when screwed together through an opening in the bottom of the trough, furnish their own means of attachment. This may be varied however at will.

For the sake of convenience in further reference, I shall designate the outer radial sets of lamps constituting the minute terminals for the hands by the letter M, and the inner radial sets of lamps used for both hours and minutes by the letter H. The method of indicating the time may then be stated as follows: Starting at 12 o'clock noon, the first seconds lamp 8$^a$ is lighted for the space of one second, after which it becomes extinguished and the lamp 8$^b$ is lighted and so on around the dial until the entire sixty lamps have been lighted and extinguished. During the minute thus elapsed all the lamps H and M in the uppermost trough 4$^a$ remain lighted, but at the end of the minute, and as the seconds lamp 8$^a$ again becomes lighted, the set of lamps at M are extinguished and the entire set of lamps H and M in the next radial trough 4$^b$ become lighted. At the same time, the first set of lamps H remain lighted still indicating the hour as 12, while the set 4$^b$ indicates the minute as one minute past the hour. At the expiration of another minute the set 4$^b$ will be extinguished and the set 4$^c$ lighted indicating two minutes past the hour, and so on until the twelfth set of minute lamps 4$^d$ is reached, and as this becomes lighted the first set of hour lamps H is extinguished and the second set H$^2$ is lighted. Every twelve minutes the lamps H shift, so that at the end of the hour the set H$^3$ pointing to 1 o'clock is lighted simultaneously with the lighting of the complete set 4$^a$. This progession goes on from minute to minute and hour to hour, in precisely the same manner as the progression of the hands of an ordinary mechanical clock, the hour lamp indications H being crossed by the minute lamp indications H M once every hour, until 12 o'clock is again reached, when they coincide as at the beginning.

I have already indicated that the divisional lamps 7 may be of a distinctive color and it should be understood that the numerals 5 indicating the hours may also be of a distinctive color such as red, blue or green. These numerals may be connected to the same feed circuit as the ring of lamps 7, burning steadily all the time.

It should be understood that while I have spoken of the seconds lamps as located in the ring 3, and the fixed division lamps outside of them in the ring 2, I may reverse this arrangement, and in fact may omit the seconds lamps entirely or locate them in the inside ring 6, which it will be observed contains sixty lamps in corresponding radial positions.

Figures 2, 3, 4:
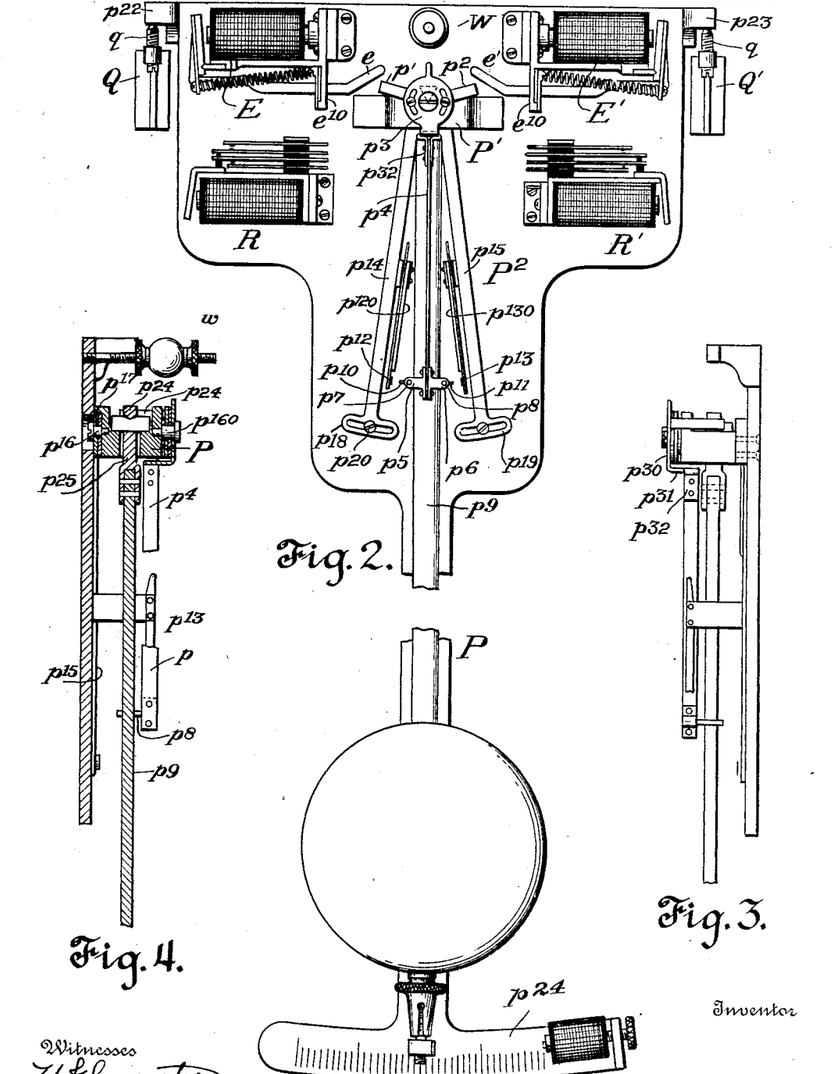
Fig. 2 is a front view of my pendulum with its actuating and adjusting mechanism.
Figs. 3 to 11 inclusive are detail figures showing parts of the pendulum and its mounting.

Having thus described the dial itself, I will refer to the primary controller or time element shown in Figs. 2 to 11 inclusive. This is supposed to be a standard seconds pendulum generally designated by the letter P, and mounted to swing upon a knife edge $p$ in a bridge P' secured upon a back plate P$^2$. In Figs. 2 and 12$^b$ R and R' are relays controlled by the pendulum in its swing which in turn controls the working electromagnets E and E', whose armature levers $e$ and $e'$ act upon opposite lever arms $p'$ and $p^2$, attached to a rocking plate $p^3$ carrying a spring $p^4$ which at its lower end is fitted with oppositely projecting lugs $p^5$ and $p^6$ carrying studs $p^7$ and $p^8$ which straddle the pendulum rod $p^9$, also carrying contacts $p^{10}$ and $p^{11}$ which coöperate with contact springs $p^{12}$ and $p^{13}$ respectively mounted upon adjustable legs $p^{14}$ and $p^{15}$ which are pivoted at $p^{16}$ in a recess $p^{17}$ behind the bridge P', and carry at their extremities lugs $p^{18}$ and $p^{19}$ with adjusting slots playing on set screws $p^{20}$ and $p^{21}$ by means of which the contacts $p^{12}$ and $p^{13}$ can be set at any desired angle to the pendulum and there locked.

In order to fully understand the mounting of the pendulum, it should be observed that Fig. 4 is a vertical longitudinal section through the upper part of the pendulum and the bridge. This figure shows the pendulum rod $p^9$, terminal portions of the spring $p^4$ (the middle part of which is broken away to show the contact spring $p^{13}$); also the adjusting leg $p^{15}$, the head of the twin leg $p^{14}$, the recess $p^{17}$ in which they are pivoted, and the pivot screw $p^{16}$ by which they are secured. This figure also shows the bridge P', having a central depression to receive the prism $p$, whose lower edge constitutes the knife edge upon which the pendulum swings. The arrangement of the rocking plate $p^3$ also appears in Fig. 4 as well as in Fig. 3, the latter figure being a side view of the same parts shown in section in Fig. 4 but looking from the other side, that is to say looking toward the left in Fig. 2. This rocking plate has a body $p^{30}$ bent under the bridge at $p^{31}$ and carrying ears $p^{32}$ which are riveted together through the upper end of the spring $p^4$, so as to hold the latter rigidly in line with the plate. This plate is centrally pivoted to rock on the shoulder screw $p^{100}$, and it should be observed that the two screws $p^{16}$ and $p^{100}$ are so located in the opposite faces of the bridge, that a line drawn through the rocking knife edge $p$ exactly coincides with the axes of both screws, whereby the legs $p^{14}$ and $p^{15}$, the levers $p'$ and $p^2$, the plate $p^3$ and the pendulum P all turn upon precisely the same center. This coincidence of centers is intended to secure perfect adjustment, lack of friction or lost motion, and accuracy of movement. In order to render the pendulum still more accurate I have provided for balancing up the entire plate $P^2$. For this purpose leveling screws $q$, $q'$ are held in brackets Q, Q' and receive upon their upper points the ears or lugs $p^{22}$, $p^{23}$ on opposite sides of the plate $P^2$. These ears extend forwardly as well as outwardly over the edges of the plate from which it will be observed I preferably mount the relays and working magnets as already stated. These however may be otherwise disposed of, so that the plate $P^2$ will carry nothing but the pendulum parts. For purposes of completeness and in order to facilitate the mechanical association of the magnets E, E' and the pendulum, I prefer the mounting shown. By raising and lowering the screws $q$, $q'$, the plate $P^2$ may be angularly shifted in opposite directions, so as to secure equidistance between the opposite contacts and therefore an equal travel in both directions, but for adjusting the plate perpendicularly to the plane in which the pendulum swings, I provide a counterweight W provided with a locknut $w$ and mounted on a threaded stud projecting perpendicularly to the plate $P^2$. In order to permit the pendulum always to swing in an absolutely vertical plane, I may provide an auxiliary knife edge at $p^{24}$, by suitably forming the edges of the opening through the metal head $p^{25}$ of the pendulum rod, which receives the prism $p$. Crossed knife edges thus being provided, the pendulum is practically hung in gimbals, and can swing with perfect freedom. Detailed description of the working magnets is thought to be unnecessary.

In order to render adjustment easier, a scale $p^{24}$ may be provided in connection with the pendulum if desired, and this scale should be rigidly connected to the plate $P^2$ as by an extension or drop arm thereon.

Figure 5:
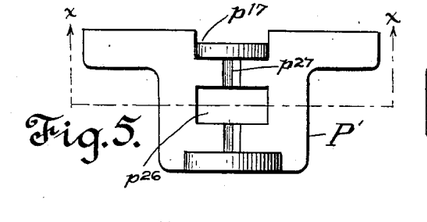
Figure 6:
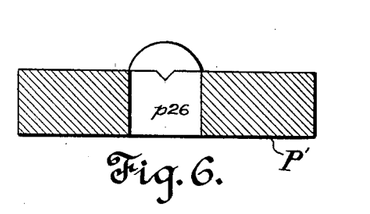
Figure 7:
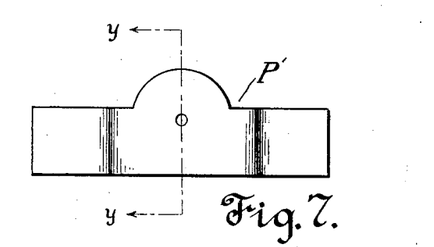
Figure 8:
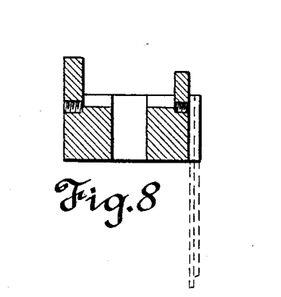
Figure 9:
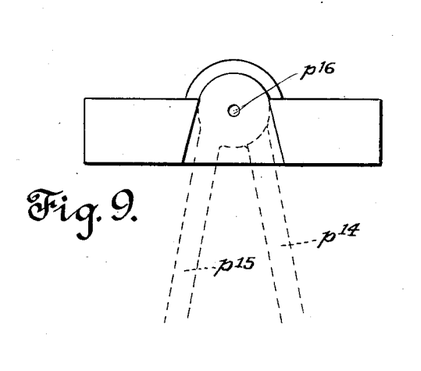
Figures 10, 11:
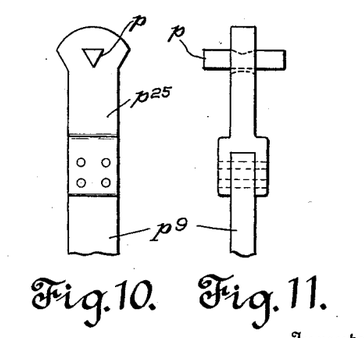

The detailed construction of the bridge is well shown in Figs. 5, 6, 7, 8 and 9. Fig. 5 is a plan view, Fig. 6 is a longitudinal section on the line $x$—$x$ of Fig. 5. Fig. 7 is a face view, Fig. 8 is a transverse section on the line $y$—$y$ of Fig. 7, and Fig. 9 is a rear elevation. The pendulum head $p^{25}$ passes up through the opening $p^{26}$ in the bridge, and the knife edge rocks in the depression $p^{27}$, which may be of any desired shape and may be fitted with one or more jewels, or with a hardened bed plate or otherwise arranged as good practice may dictate.

Figure 12:
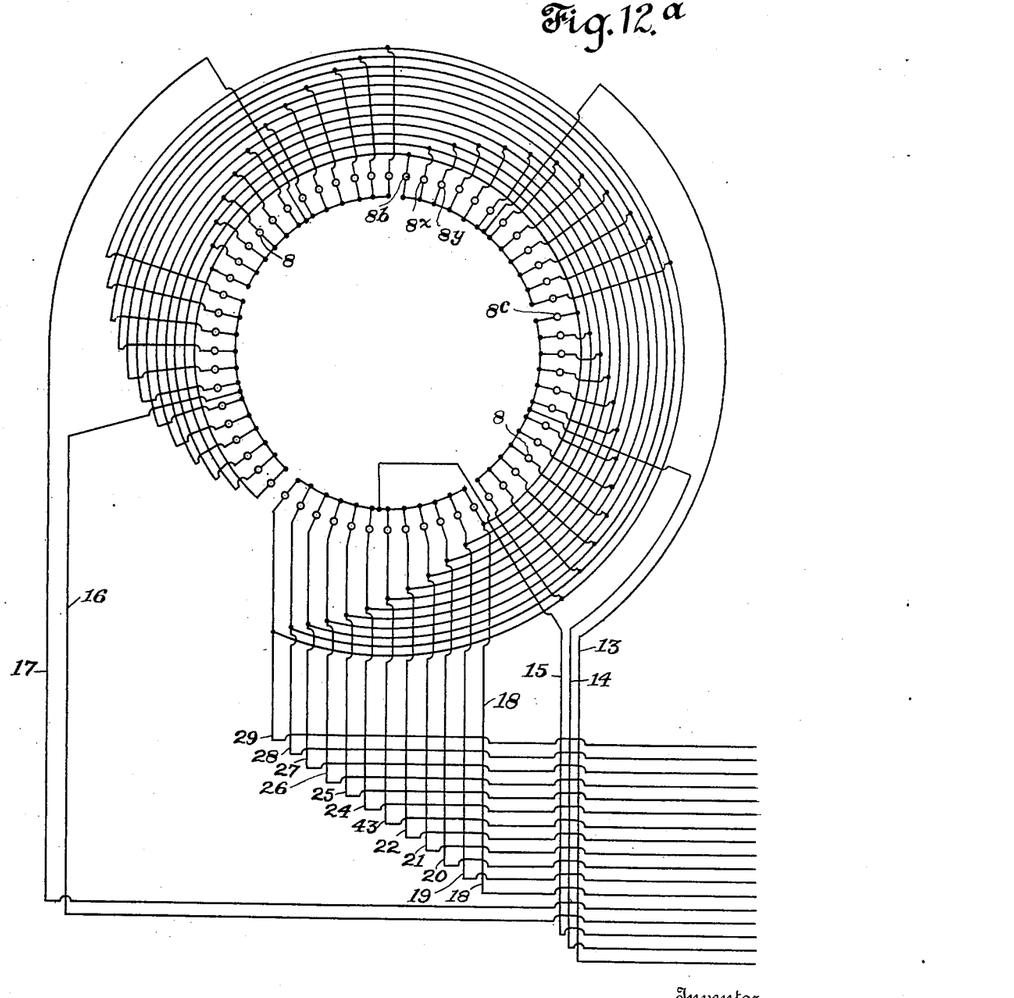
Figure 12B:
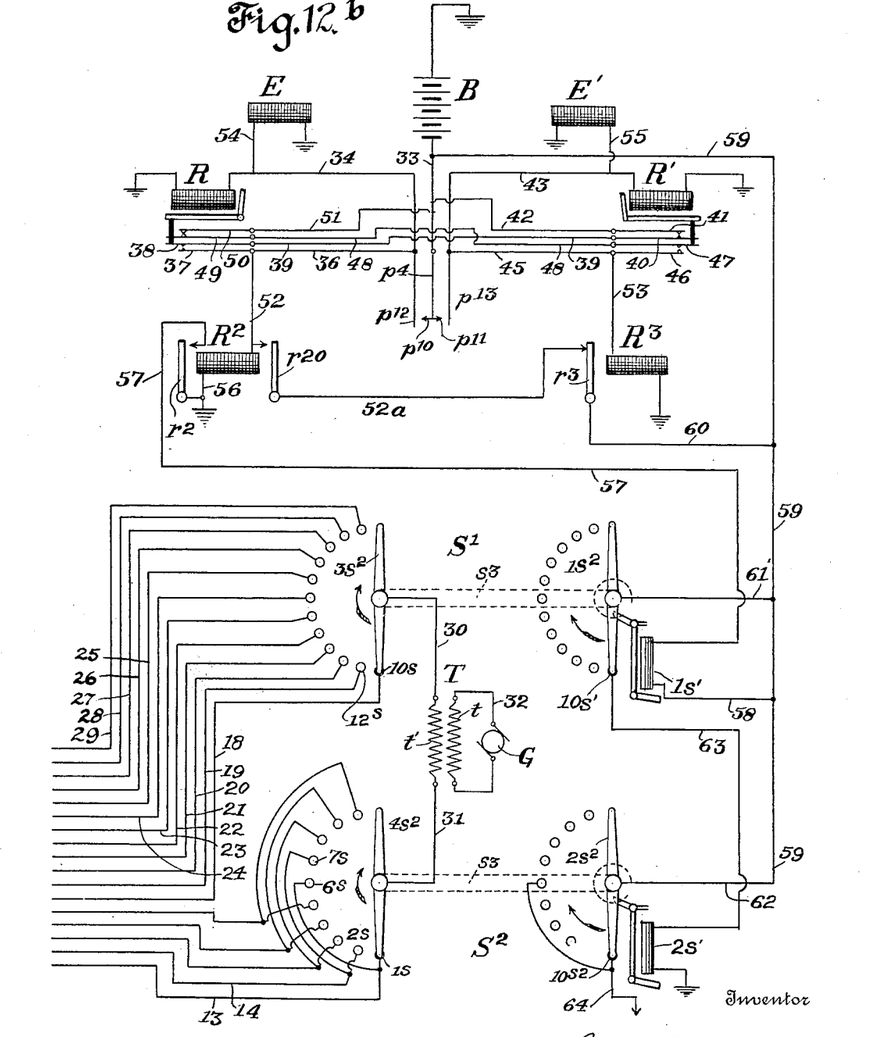

Referring now to Figs. 12$^a$ and 12$^b$, I have therein shown the circuits of the pendulum, and of the lamps 8 indicating seconds with their controlling switches. In Fig. 12$^a$ it will be observed that the circle of sixty lamps is divided into five groups of twelve lamps each. The twelve lamps of each group have a common return wire on one side, and are severally connected to twelve different wires on the other side. The group common return wires are indicated at 13, 14, 15, 16 and 17. The twelve other wires referred to, each of which constitute common returns for corresponding lamps in all the groups, are indicated at 18, 19, 20, 21, 22, 23, 24, 25, 26, 27, 28 and 29. As fully explained in my patent hereinbefore referred to, it is possible by making different combinations of these two sets of wires, to complete the circuit of any desired individual lamp. Thus by connecting one side of a battery to wire 18 and the other side to wire 13, current will be caused to flow through the lamp 8$^b$, but if the wire 14 were used instead of the wire 13, current would then flow through the corresponding lamp 8$^c$ in the next group.

For the sake of brevity I will designate the wires numbered from 13 to 17 as "group" wires, and the wires 18 to 29 inclusive as "individual" wires. It will be understood that all these wires pass into the diagram of Fig. 12$^b$ where the group wires go to the contacts of the switch S$^2$, while the individual wires similarly go to the contacts of the switch S'. There is a slight difference between these two switches in that the first switch has ten contacts in each circular row, while the second has twelve. This is rendered necessary by the different numbers of wires to be handled. As there are only five wires from 13 to 17 inclusive connected to the switch $S^2$, and as this switch always turns in the same direction, it is possible to handle the five wires in recurring series by simply connecting each wire to two contacts as shown. Thus the wire 13 goes to contact $1^s$ and also to contact $6^s$. The wire 14 goes to contact $2^s$ and contact $7^s$, and so on. On the other hand, there being twelve individual wires and twelve contacts on the switch $S'$, each wire has its own contact. Each of the switches $S'$ and $S^2$ has a second bank of contacts. These are used in the present case only for control purposes. It should be understood that the switch $S'$ is driven directly from the pendulum and takes one step every second. At each complete rotation of this switch it communicates current to the switch $S^2$, moving it one step, so that the switch $S^2$ passes over each set of five contacts in sixty seconds, or one minute. The spindle of the switch $S'$ is rotated by the electromagnet $1^{s'}$, while the spindle of the switch $S^2$ is similarly rotated by the electromagnet $2^{s'}$. The first magnet $1^{s'}$ is controlled by the relay $R^2$, which receives current when the pendulum swings in one direction, and locks itself on a circuit controlled by the relay $R^3$, which receives current as the pendulum rocks in the opposite direction and opens the locking circuit so as to cut off the relay $R^2$ and instantly open the circuit of the magnet $1^{s'}$. Thus the operation of this magnet is made positive as the relay $R^2$ remains energized during the entire period of a half swing of the pendulum.

The magnet $2^{s'}$ receives its current through the first contact $10^s$ of the switch $S'$, through which the battery circuit is completed by contact with its wiper $1^{s2}$. It should be here explained that for the sake of simplicity I have shown the circuit wires running direct to the wipers on one side, but in the actual switch there is no wire connection to the wiper, the switch used being of the type described in my copending application Serial No. 569,606 filed June 29, 1910, and a division hereof.

In order to supply current through the main switch banks of switches $S'$ and $S^2$ to the two sets of wires going to the lamps, I connect the two wipers $3^{s2}$ and $4^{s2}$ through wires 30 and 31 to opposite sides of a battery or other source of current. This source is shown in Fig. $12^b$ as the secondary winding $t'$ of a transformer T whose primary $t$ is fed through a circuit 32 by generator G. In order to avoid the formation of cross circuits and interfering circuits in the combination of wires set up, it is desirable to have a separate source of current across each associated pair of switches like $S'$ and $S^2$. It would of course be entirely feasible to have separate storage batteries or even separate generators for this purpose, but the simplest and most economical plan is to have separate transformer secondaries all fed from a common primary circuit.

Referring again to the pendulum circuit, the spring $p^4$, and the contacts $p^{10}$, $p^{11}$, $p^{12}$ and $p^{13}$ can readily be identified by comparison with Fig. 2. The spring $p^4$ is connected through wire 33 to the main battery B, or other suitable source of current, connected on the other side as shown to ground or a common return. Contact $p^{12}$ is connected by wire 34 to the relay R which on the other side is connected to the ground or common return. The wire 34 and contact $p^{12}$ are connected by a branch 36 to normally open contacts 37, 38 in the relay R, thence by wire 39 to the normally closed contacts 40 and 41 in the relay $R'$, and thence by the wire 42 to the battery B. Contact $p^{13}$ on the other hand, is connected by wire 43 to the relay $R'$ which on the other side goes to ground or common return. From the wire 43 and contact $p^{13}$ a branch wire 45 leads to normally open contacts 46 and 47 in relay $R'$ thence by wire 48 to the normally closed contacts 49 and 50 in the relay R and thence by wire 51 to battery. If these two circuits are traced, it will be found that when the relay R is energized by the closure of contacts $p^{10}$ and $p^{12}$ in the swing of the pendulum, this relay by closing contacts 37 and 38 will lock itself, and by opening the contacts 49 and 50 will simultaneously unlock the relay $R'$, which thereupon becomes deënergized. At the other end of the swing of the pendulum, when the contacts $p^8$ and $p^{13}$ are reached, the relay $R'$ in turn becomes energized, closes the contacts 46 and 47 so as to lock itself and opens the contacts 40 and 41 so as to unlock the relay R. Thus each relay remains energized during the entire half swing of the pendulum. The relays $R^2$ and $R^3$, which as already stated control the first switch magnet $1^{s'}$, are connected respectively through wires 52 and 53 to the branch wires 36 and 45, that is to say to the contacts 37 and 46, whereby they receive current at opposite ends of the stroke of the pendulum also. The working magnets E, $E'$, are shown in parallel with the relays R, $R'$, included in branch wires 54 and 55, but of course they can be controlled by the said relays through local circuits if desired.

Figure 13:
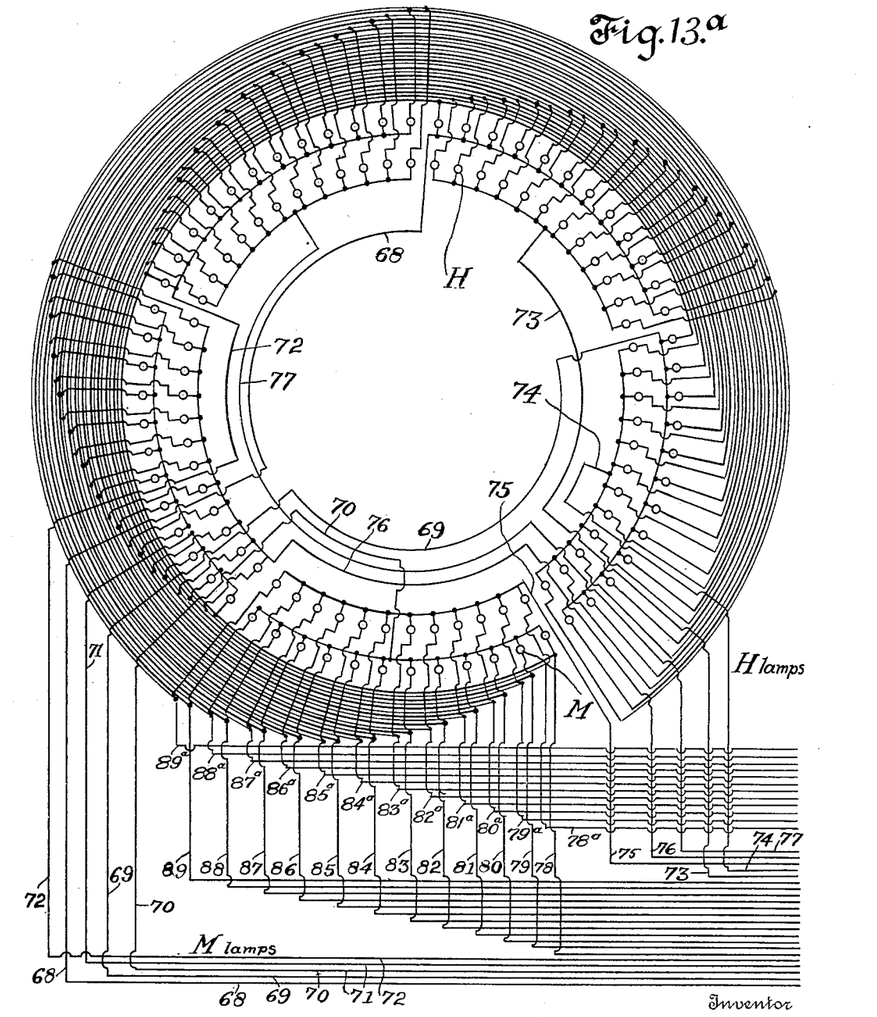

At the bottom of Fig. $12^b$, it will be observed that a wire 64 leads from the first contact $10^{s2}$ of the second bank of the switch $S^2$. This corresponds to the wire 63 leading from the first contact $10^{s'}$ of the switch $S'$. The wire 63 goes to the magnet $2^{s'}$; and the wire 64 passes into Fig. 13$^b$ and goes to the winding of the magnet 3$^{s'}$, of the switch S$^3$. The first contact 10$^{s3}$ of the controlling bank of this switch is connected by a wire 65 and multiple branches 66 and 66$^a$ to the magnets 4$^{s'}$ and 5$^{s'}$ of the switches S$^4$ and S$^5$ respectively, and finally from the first contact 10$^{s5}$, of this switch S$^5$ a wire 67 passes to the magnet 6$^{s'}$ of the switch S$^6$. Thus each switch in its rotation controls the working magnet of the next switch and as the first switch S' is controlled directly by the pendulum, each successive switch is reduced in its rate of motion, but depends primarily upon the pendulum, and as long as this is accurate, all the switches will keep perfect time.

Figure 14:
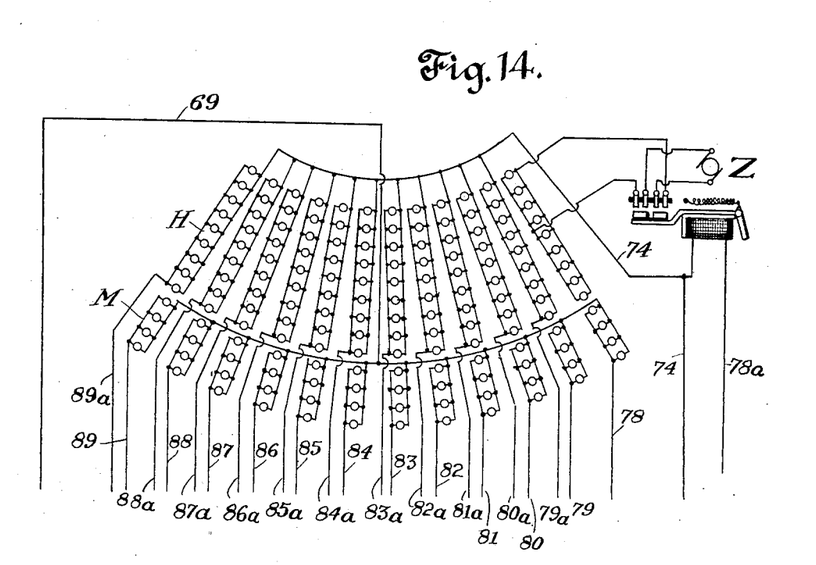
Fig. 14 is a detail diagram showing a portion of the circuits in Fig. 13$^a$.

Referring now more particularly to Figs. 13$^a$ and 13$^b$ in the first of these I have indicated the hours' and minutes' lamps H and M by single circular sets. It should be understood, however, that each lamp marked H in Fig. 13$^a$ relates to the entire radial set of lamps shown in Fig. 1 as extending from the ring 6 to the division point 9 of the radial trough, or nine in all. Of course this number may be varied, as all the lamps in any radial set are supplied from the same feed wire, either in parallel or in series according to the voltage and other conditions. Similarly, the single lamps marked M in Fig. 13$^a$ are intended to designate the entire row of four or more lamps extending in Fig. 1 from the point 9 to the point 10 of each radial trough. These also may be varied in number. In Fig. 14 I have shown a portion of the lamp circuit of Fig. 13$^a$ elaborated so as to make the foregoing statement clear. Herein appears one set of twelve radial rows of lamps as they are actually wired up, the constituent portions of each row being marked H and M to connect them with Figs. 1 and 13$^a$. Of course the lamps in Fig. 12$^a$ are actually single lamps, as represented also in Fig. 1, being the seconds lamps around the dial; but even these might be radial sets of lamps to represent the seconds hand moving around if desired.

The ring of sixty lamp strips H in Fig. 13$^a$ is divided into five groups of twelve each, these groups being severally served by the group and common return wires 68, 69, 70, 71 and 72. The lamps M are similarly divided into five groups of twelve radial sets each, these groups being severally served by the group or common return wires 73, 74, 75, 76 and 77. Each of the lamp sets H and M of each group are served by a separate set of individual wires. The individual return wires for group M are marked 78 to 89 inclusive. Wire 78 goes to the first lamp of the M set, in every one of the five groups, wire 79 goes to the second lamp in every one of the five groups and so on.

Similarly the set of individual wires 78$^a$ to 89$^a$ serves the lamps of the H set. Thus, we have in this Fig. 13$^a$, for the hours and minutes rows of lamps, four distinct sets of controlling wires, the first set numbered from 68 to 72 inclusive, the second set numbered from 73 to 77 inclusive, the third set from 78 to 89 inclusive, and the fourth set 78$^a$ to 89$^a$ inclusive. By combining any wire of one set with any wire of any of the other sets, we can light any desired row of lamps on the dial of Fig. 1. To effect these combinations is the function of the switches S$^3$ to S$^6$ inclusive, as shown in Fig. 13$^b$.

Referring now particularly to Fig. 13$^b$ it will be found that the group of wires 73 to 77 which represent the H lamps, are connected in parallel to the contacts in one bank of the switch S$^6$ (which is the hour group switch) and to the contacts in the second bank of the switch S$^4$ (which is the minute group switch). The reason for this is obvious since the lamps H are used to designate both hours and minutes. The group of wires 68 to 72 on the other hand which feed the M lamps, used for minutes only, are carried simply to the first bank of contacts in the switch S$^4$. The individual wires 78 to 89 are carried to switch S$^3$ while the individual wires 78$^a$ to 89$^a$ from the inner or hour lamps are carried to both switches S$^3$ and S$^5$, so that either the hour group switch or the minute group switch, in combination with the individual switch of each, may control any desired row of lamps H and M. The reason for carrying the wires 78 to 89 78$^a$ to 89$^a$ to separate banks of the switch S$^3$ is because separate sources of current are employed as indicated at $t^3$ and $t^5$, in order to avoid the formation of parallel circuits and the lighting of lamps which are not desired thereby. These sources of current may be batteries or separate generators or separate windings on the same generator, or as shown in Fig. 13$^b$ they may advantageously be separate secondary windings acted upon by the primaries $t^2$ and $t^4$ fed from the generator G. The secondary $t^3$ sends current through the M lamps only, but the secondary windings $t^7$ (of switch S$^5$) and $t^5$ (of switch S$^4$), are both adapted to feed the H lamps.

Further details of the system will be fully understood from the following statement of operation: We will assume the pendulum of Fig. 2 to be swinging, alternately closing the contacts $p^{10}$, $p^{12}$ and $p^{11}$, $p^{13}$. At the first closure of the former, current is sent through the relay R$^2$ by the following path: B, 33, $p^4$, $p^{10}$, $p^{12}$, 36, 52, R$^2$, 56 and ground back to battery. At the same time the relay R receives current through the following path: B, 33, $p^4$, $p^{10}$, $p^{12}$, 34, R, and battery. The electromagnet E of the pendulum is simultaneously energized by current passing through wire 34, through wire 54 to the magnet and ground back to B. The electromagnet E being energized attracts its armature and forces the lever arm $e$ down against the rocking arm $p'$ on the plate $p^3$, so as to rotate the plate on its pivot screw and flex the spring $p^4$ toward the right in Fig. 2. At this moment it will be understood the pendulum P is at the left hand end of its stroke, the contact arms $p^{14}$ and $p^{15}$ being adjusted so that the actual contact is effected just prior to the end of each swing. In order to make this adjustment accurate I provide the contact springs $p^{12}$ and $p^{13}$ with relatively heavy and rigid supporting pieces $p^{120}$ and $p^{130}$, on which the springs normally rest under pressure, and from which they are lifted when the pendulum contacts touch them so as to transfer this pressure to the moving contacts instantly and without any lost motion.

Simultaneously with the action of magnet E, the relay R opens the contacts 49 and 50 and closes the contacts 37 and 38. A locking circuit for the relay R and incidentally for the magnet E is thereby created as follows: B, 33, 42, 41, 40, 39, 38, 37, 36, 34, R, 35, and 54, E, back to battery. A branch of the same circuit at 52 passes through the relay $R^2$, which however has a separate locking circuit as follows: B, 59, 60, $r^3$, $52^a$, $r^{20}$, $R^2$, 56 and back to battery. This circuit depends on the action of the relay $R^3$ which is not energized until the pendulum has swung to the right. By this means only one impulse is sent to the magnet $1^{s\prime}$ of the first switch for each complete double swing of the pendulum and insures that only one lamp per second shall be lighted. Of course this division of time can be made anything desired, and by adding or taking away relays and contacts, the pendulum may be made of any length, the arrangement of switches and relays corresponding in this respect to the trains of gears in a clock movement.

It will be observed that on the completion of the circuits already traced, and during the swing of the pendulum from left to right, the relays and magnet $R'$, $R^3$ and $E'$ are all deënergized. This is insured by the action of relay R which opens the contacts 49 and 50 included in the locking circuit of the several opposite magnet coils.

The energization of the relay $R^2$ closes the following circuit to the switch $S'$: battery B, 59, 58, $1^{s\prime}$, 57, $r^2$, ground, B. The magnet $1^{s\prime}$ is thereupon energized and steps the spindle $s^3$ around the distance of one tooth, moving the wiper arms $1^{s2}$ and $3^{s2}$ from the first to the second contacts of their respective banks. With the arms in the position shown in Fig. $12^b$ which is taken as the starting position, a circuit to the seconds lamps in Fig. $12^a$ was already established and current flowing as follows: $t'$, 31, $4^{s2}$, $1^s$, 13, $8^b$, 18, $10^s$, $3^{s2}$, 30, $t'$. The lamp $8^b$ was therefore glowing, indicating the first second of the minute. As the arm $3^{s2}$ passes over to the second contact however, this circuit is shifted from the wire 18 to the wire 19, and the next lamp in order is lighted as follows: $t'$, 31, $r^{s2}$, $1^s$, 13, $8^x$, 19, $12^s$, $3^{s2}$, 30, $t'$. The first lamp having lost its current of course ceases to glow, and the second lamp is lighted thus starting the progression of seconds. The pendulum now swings toward the right in Fig. 2 and as it reaches the end of its arc of motion the contacts $p^{11}$ and $p^{13}$ are closed. Relay $R'$ is then energized over the following path: B, 33, $p^4$, $p^{11}$, $p^{13}$, 43, $R'$, and B. Electromagnet $E'$ also takes current from wire 43 through the branch 55 and relay $R^3$ takes current through the branch 53 from the wire 45. The energization of relay $R'$ results in the opening of contacts 40, 41 thus breaking the locking circuit of the relay R on the other side of the pendulum and thereby instantly deënergizing R, $R^2$ and E. At the same time contacts 46 and 47 are closed creating a locking circuit for the relays and magnet $R'$, $R^3$ and $E'$ which then remain energized until the pendulum completes its swing in the other direction. A complete swing is insured by the magnet $E'$ which forces the lever arm $e'$ down against the rocking arm $p^2$, rotating the plate $p^3$ so as to flex the spring $p^4$ to the left, thereby causing the stud $p^8$ to exert pressure on the pendulum rod $p^9$ toward the left (pressure to the right having previously been exerted by stud $p^7$).

The energization of $R^3$ attracts the armature $r^3$ and opens the circuit of magnet $1^{s\prime}$, which thereupon becomes deënergized and its armature retracted during the backward swing of the pendulum rod for the next closure. At such next closure of the contacts $p^{10}$ and $p^{12}$, the same effect is produced on R, $R^2$ and E, and the circuit 56 and 57 to the magnet $1^{s\prime}$ is again closed, to advance the switch $S'$ another step whereby the lamp circuit is shifted to the third wire 20 lighting the third seconds lamp $8^y$; and so on until the switch wipers $3^{s2}$ and $1^{s2}$ have passed over the entire twelve contacts. The entire twelve lamps in the first group have then been lighted in succession and at the next swing of the pendulum the switch taking one more step, the wiper arms come again into the position shown in Fig. $12^b$ closing circuit to the first contacts $10^s$ and $10^{s\prime}$. This closes the operating circuit of the magnet $2^{s\prime}$ of the second switch as follows: B, 59, 61, $1^{s2}$, $10^{s\prime}$, 63, $2^{s\prime}$, ground, B. The magnet $2^{s\prime}$ then attracts its armature and steps its spindle $s^3$ around one tooth shifting the wiper $4^{s2}$ from the first contact $1^s$ to the second contact $2^s$, whereupon the lamp circuit is shifted to the second group over the wire 14, and the first lamp $8^c$ of the second group is lighted, being the thirteenth lamp in the series. It should be noted that at the same time the wiper arm $2^{s2}$ passes off the contact $10^{s2}$, and so disconnects battery from the wire 64 which leads to the working magnet of the next switch in order ($S^3$). The switch $S^2$ then remains in the same position until the switch $S'$ in response to the movements of the pendulum has made twelve more steps and has lighted the twelve lamps of the second group in succession, whereupon as already explained the circuit 63 is again connected to battery and the switch $S^2$ set forward another step, thereby cutting in the third group of lamps, and so on. This action continues until the switch $S'$ has made five complete rotations or sixty contacts, in response to sixty swings of the pendulum, which have resulted in lighting the sixty seconds lamps of Fig. $12^a$ in succession. The switch $S^2$ has now covered all the groups and serves on contact $6^s$ to again connect the first group of lamps through the wire 13. At the same time the arm $2^{s2}$ has reached the sixth contact in its bank, which is multiplied with the first to wire 64, and battery is immediately connected through this wire 64 to the magnet $3^{s\prime}$ of the switch $S^3$ in Fig. $13^b$, as follows: B (Fig. $12^b$) 59, 62, $2^{s2}$, $10^{s2}$, 64 (into Fig. $13^b$) $3^{s\prime}$, ground, and B. The magnet $3^{s\prime}$ becomes energized and steps its spindle and wiper arms forward the space of one tooth. This closes the following circuit through switches $S^3$ and $S^4$: current source $t^3$, $5^{s2}$, first contact of $S^4$, wire 68, first row of M lamps in the first group, wire 78, first contact of $S^3$, $6^{s2}$, back to the source. At the same time a parallel circuit is closed through the second banks of the two switches $s^3$ and $s^4$ as follows: $t^5$, $7^{s2}$, first contact, wire 73, first row of H lamps in the first group, wire $78^a$, first contact in the second bank of $S^3$, $8^{s2}$, and back to source. Thus the entire row of lamps both H and M in the first radial trough $4^b$ of Fig. 1, are lighted simultaneously. In the meantime, the hour is indicated by the lighting of the H lamps only of the same row by reason of the switches $S^5$ and $S^6$ being in the position shown in Fig. $13^b$. Their circuit is as follows: $t^7$, 90, $9^{s2}$, first contact of $S^6$, wire 73, first row of H lamps in the first group, wire $78^a$, first contact of $S^5$, $10^{s2}$, 91 and $t^7$.

Thus it will be observed that when the hour and minute lamps are crossing, the H lamps receive current from both the hour and minute switches over parallel paths, the two sources of current $t^5$ and $t^7$ feeding in parallel. No complication results from this however, and at the very next step of the minute switch the condition ceases to exist, because as soon as the wiper arms $6^{s2}$ and $8^{s2}$ are stepped forward by an additional impulse over the wire 64 (coming from the seconds switch in Fig. $12^b$), the next succeeding row of H and M lamps at $4^b$, (or $H^2$) is lighted, leaving the H lamps alone of the row $4^a$ still burning and controlled by the switches $S^5$ and $S^6$. The lamps in row $4^a$ will continue to burn, indicating the hour, until twelve minutes have elapsed, that is to say until the minute individual switch $S^3$ has made twelve steps, when circuit will be closed for both the magnets $4^{s\prime}$ and $5^{s\prime}$ in parallel, as follows: battery B, $59^a$, $11^{s2}$, 65, 66 to magnet $4^{s\prime}$ and $66^a$ to magnet $5^{s\prime}$. The switch $S^5$ is therefore stepped forward one step simultaneously with the switch $S^4$, and with the present arrangement of circuits, these two switches might be mounted on the same spindle, if the banks contained a sufficient number of rows of contacts. The hour lamps in the row $4^a$ are thus extinguished and those in the row $4^b$ are lighted and at the same time the complete set of minute lamps have lighted in succession in all of the twelve rows and the switch $S^4$ shifts from wires 68 to 69 and 73 to 74, thereby shifting from the first to the second group of twelve rows of both H and M lamps on the dial. The action of these switches $S^3$, $S^4$ and $S^5$ then continues as thus stated, until the first twelve rows of H lamps as determined by the switch $S^5$ have been lighted in succession to show the hour. By this time the entire five groups of minute lamps have been lighted twice and the first two groups three times as determined by the motion of switch $S^4$, the row in each group of course being successively brought into circuit by the switch $S^3$. This represents two and two-fifths hours, or one fifth of the twelve hour cycle. At the end of this time the wiper arm $12^{s2}$ of the switch $S^5$ comes on the contact $10^{s5}$ and current is supplied from the battery through the wire 67 to the magnet $6^{s\prime}$ which thereupon steps forward the spindle of the switch $S^6$, shifting the wiper arm $9^{s2}$ to the next contact in order, thereby shifting from wire 73 to wire 74 and so on as the time progresses. This shifting of the hour group wires is only performed five times in twelve hours, since for each step of the switch $S^6$ twelve rows of H lamps are lighted by the switch $S^5$. The five rows of hour lamps which are thus lighted during the space of each hour of time, might be replaced by one or two rows per hour, and if one row, then the switch $S^5$ would only shift once per hour, and the switch $S^5$ might be omitted. However I consider the present arrangement as preferable, especially since the rows of H and M lamps would have to be provided anyhow for the minutes indications, and by the arrangement heretofore described, I make them serve a double purpose.

The accuracy of this time piece can be made as great as desired. The strength of current fed to the magnets E, E' of the pendulum may vary without impairing this accuracy since each armature lever has a stop consisting of a slotted plate $e^{10}$ in which it plays so that the amplitude of its movement is constant, and a constant torsional effect is thereby produced upon the plate $p^3$ and the spring $p^4$. The two arms $p'$ and $p^2$ are adjustable on the plate $p^3$ by means of set screws working in arc shaped slots as shown, and this it is thought will be sufficiently clear to those skilled in the art without any further description.

Sundry changes and modifications are possible in the form and arrangement of the several parts of the system thus far described, without departing from the spirit of the invention or the principles involved therein. For example, a simple reversal of the magnetic action on the pendulum may be secured by passing the levers $e$ and $e'$ under the arms $p'$ and $p^2$ and by reversing the magnets causing them to exert upward pressure instead of downward. The circuit connections from the pendulum contacts then being reversed, and the respective contacts set to be closed just before the end of each half swing, the effect would be to pull the pendulum up to the full end of its swing, and then let go, instead of pushing it back as herein described. Various other changes in the arrangement and relation of the magnets E and E' of the relays R and R' and the contacts $p^{10}$, $p^{11}$, $p^{12}$ and $p^{13}$, will readily occur to those skilled in the art, and need not be more specifically pointed out by me.

Various types of pendulum may be employed compensating or otherwise. To coöperate with this pendulum other indicating devices than lamps may be employed and other forms of switch than that described may be used. In large clocks for example, with many lamps or equivalent electrical devices, the current flow would be quite considerable, and in such case either the wiper arms or contacts of the switches shown herein must be made much heavier in themselves, or else they must be used for simple control of heavier switches individually appropriated to the several circuit wires. This really involves the mere insertion of relays (which are magnetically controlled switches) in the several circuit wires to the lamps, the magnets of the relays connected to the several switch contacts and the heavy blades and clips connected in the circuits 13 to 17, 18 to 29, 68 to 72, 73 to 77, and 78 to 89 all inclusive. A switch for each of these wires, with a magnet to close it and a spring or other device to open it, the magnet being connected to a contact of the appropriate switch S', $S^2$, etc., would enable any necessary amount of current within reason to be handled without otherwise departing from the disclosure herein.

Since the inclusion or exclusion of relays and switches in electrical circuits, between controlling devices and translating means, are within the ordinary knowledge of every electrician and engineer, I do not consider it necessary to further describe this modification; but its nature is indicated at Z in Fig. 14, where the lamp wire is controlled by a knife switch magnetically controlled from the time switch. There also may be changes in the structure of the dial shown in Fig. 1. This is supposed to be made of metal channels, riveted together, with outer rings 2 and 3, an inner ring 6, and radial members 4. A section of an individual member is shown in Fig. 1ª wherein $x$ is the middle channel, which may well be plated or painted white inside, and coppered or otherwise protected from the weather on the outside, L is the lamp and 1' the lamp socket. A simple manner of attaching the lamps is indicated in this figure by putting the socket on one side of the channel bottom and screwing the lamp into the other through a hole in said bottom which should preferably be bushed with an insulating ring. In the drawing this frame is indicated as mounted upon a rigid support or base 1 but obviously this is no part of the invention and may be omitted, the frame being sufficient to carry the lamps, and in itself constituting the dial. The indicating numerals 1, 2, 3, 4, etc., are made of bent channels, and are fixed on the frame by riveting or otherwise. It will be observed that their lamps are spaced so as to supplement those in the radial sets so far as possible. A modified form of dial is disclosed in my copending application Serial No. 569,608, filed June 29, 1910.

Referring now to Fig. 14, I have therein shown a group of lamps constituting one-fifth of the entire assemblage upon the front of the dial, and divided into hour and minute lamps, designated by the letters H and M, as in Figs. 1 and 16. The seconds lamps are not shown, for the reason that the circuits would be the same as in Fig. 12ª as these lamps are preferably single; whereas Fig. 14 is intended to show how a row of lamps is connected up in parallel when arranged to represent the hands shown in Fig. 1. The particular group is that served by the wires 69 and 74, and the individual lamp wires 78 to 89ª inclusive.

The relays and controlling switches are preferably all mounted on supporting racks of angle iron having vertical side members and horizontal cross members to support the parts, which are designed to be attached to the face of the cross members by screws or bolts, with their contacts exposed in front and the wiring or bank terminals all exposed to the rear, so that the wiring is all done from the rear of the rack. From this rack a 65-conductor cable is conducted to a point at or near the clock dial, where the cable wires are connected each to its own terminal on a rack through which the terminals extend with their outer ends exposed for cross connection to the open wires or branch cables leading to the several group and individual circuits on the dial. This idea of placing a junction box or terminal rack at or near the clock dial is very desirable for several reasons, among which may be stated (1) that it permits the dial circuits to be easily disconnected and tested or repaired; (2) that it permits more than one dial to be connected in parallel to the same set of cable wires which is important where the clock is used on a tower having say four dials; (3) that in case of a burnout or trouble on any one wire in a cable, this wire can be cut out and a "spare" substituted therefor by simply noting the numbers of the two wires to be interchanged and so interchanging them at the terminals at both ends of the cable. (It is to be noted that a 65 wire cable allows a number of "spares" since the clock dial illustrated really requires only 58 wires.)

I am aware that a number of changes may be made in matters of detail herein without departing from the scope of the invention. It is to be understood that I contemplate all such non-essential changes and modifications as fall fairly within the scope of my appended claims. As an example of such change, attention may be called to the fact that the system, including the step by step switches and their circuits, may be operated by some other periodic element than a magnetically driven pendulum. The magnets E and E' of Fig. 2 may be omitted, and an ordinary clock movement used with either a pendulum, a balance wheel, a torsion weight, or any other periodically moving part, with contacts so arranged that they will be opened and closed in successive movements so as to send energizing impulses to the switches, either directly, or through the intermediation of the relays R and R'. Again, the switches and their connections, or the magnetically driven pendulum and its connections, or both, may be used with another kind of dial instead of a lamp dial.

As explained in my patent hereinbefore referred to, electromagnetic indicators may replace the lamps on the dial, being operated in succession in the same manner as the lamps herein described, and on similar circuits. Other changes will readily occur to those skilled in the art. Such persons will also understand after reading the description herein, that the usual mechanical and electrical expedients are to be employed in putting this invention into practice, which I have deemed it unnecessary to illustrate and describe.

Contact points should all preferably be of platinum, and in general the present illustration and description should be regarded as explanatory but not restrictive or exclusive in its nature. This extends to the uses as well as the nature of the invention.

Obviously as a guide to the eye, a center lamp can be mounted on any clock as well as a ring of fixed lamps outside the circle, and if desired, markers for the hours.

Having thus described my invention what I claim and desire to secure by Letters Patent is:

1. In an electric clock system, a plurality of indicating devices arranged in chronometric progression, a source of current, switching means for connecting said source to the indicating devices in order, and a controlling device for the switching means comprising an element having a fixed natural period of movement, and electromagnetic actuating means automatically controlled in the periodic movement adapted to counteract the retarding effect on said element due to external causes.

2. In an electric clock system, time indicating devices, means for supplying energy thereto, and means for controlling the energy supplied comprising contacts, a moving actuating element therefor having a fixed natural period, a source of current, means for applying energy from said source to the moving element at the end of its movement, and means for maintaining said application during a definite period of time thereafter.

3. In an electric clock system, time indicating devices, means for supplying energy thereto, and means for controlling the energy supplied comprising contacts, an oscillating actuating element therefor having a determinate natural period, a source of current, means for applying energy from said source to the oscillating element at the end of each oscillation, and means for rendering each application of energy effective during the entire succeeding oscillation.

4. In an electric clock system, time indicating devices, means for supplying energy thereto, and means for controlling the supply of energy comprising contacts, a moving actuating element therefor having a fixed natural period, a source of current, electromagnetic means supplied from said source and adapted to act upon the moving element at the end of its movement, and means for maintaining during a definite period each electromagnetic condition when established.

5. In an electric clock system, time indicating devices, means for supplying energy thereto, means for controlling the energy supplied comprising contacts, an oscillating actuating element therefor having a determinate natural period, a source of current, electromagnetic means connected thereto adapted to act upon the oscillating element at the end of each oscillation, and means for maintaining the flow of current to said electromagnetic means during the succeeding oscillation.

6. In an electric clock system, time indicating devices, means for supplying energy thereto, and means for controlling the energy supplied comprising contacts, a pendulum controlling said contacts and having a fixed natural period, electromagnets adapted to act upon said pendulum at opposite points in its swing, a source of current for the magnets, means under the control of the pendulum for supplying current to the magnets alternately, and means controlled by each magnet for maintaining its own current supply during a definite period of time.

7. In an electric clock system, time indicating devices, means for supplying energy thereto, and means for controlling the energy supplied comprising contacts, a pendulum controlling said contacts and having a fixed natural period, electromagnets adapted to act upon said pendulum at opposite points in its swing, a source of current for the magnets, means under the control of the pendulum for supplying current to the magnets alternately, and means controlled by each magnet for maintaining its own current supply during a definite period of time and for simultaneously disabling the opposite magnet.

8. In an electric clock system, time indicating devices, means for supplying energy thereto, and means for controlling the supply of energy comprising switching means for the time indicating devices, an oscillating actuating element for said switching means having a predetermined path of travel, electromagnetic actuating means for said element, a source of current, contacts closed by the element in its oscillation for initially supplying current to the actuating means, and a locking circuit controlled by the actuating means for maintaining the current supply thereto during the succeeding movement of the oscillating element.

9. In an electric clock system, time indicating means, a source of energy therefor, and a controlling device for said energy comprising switching means for the time indicating devices, an oscillating actuating element for said switching means having a determinate period of oscillation, contacts closed alternately by said element at opposite points in its travel, actuating means acting on the elements at opposite points of its travel, a source of current, circuit connections including the source of current, the pendulum contacts, and the electromagnetic actuating means, together with a locking circuit for each actuating means jointly controlled by both actuating means.

10. In an electric clock system, time indicating means, a source of energy therefor, and a controlling device for said energy comprising switching means for the time indicating devices, a pendulum for actuating said switching means and having contacts adapted to be closed at opposite points in its swing, a pair of electromagnets with armature levers adapted when the magnets are energized to impart motion to the pendulum in opposite directions, a pair of relays controlling said magnets, initial energizing circuits extending from the opposite pendulum contacts to the opposite relays, and a locking circuit for each relay adapted to be closed by its own relay and opened by the opposite relay, whereby alternate momentary closures at the pendulum contacts will produce alternate protracted closures of the relay circuits and correspondingly protracted energization of the actuating magnets.

11. In an electric clock system, a source of current, commutating devices and a chronometric controller therefor, in combination with a dial comprising an open frame constructed of separated inner and outer annular members, and radial members spaced apart connecting the two, a plurality of incandescent lamps in predetermined groups secured upon each member, and circuit connections from said groups to the commutating devices, whereby successive groups of lamps may be lighted to indicate successive divisions of time.

12. In an electric clock system, a source of current, commutating means and a time controller therefor, and a dial comprising an open frame having separate inner and outer annular channeled members, a series of radial members spaced apart connecting the two, and a plurality of groups of incandescent lamps mounted in each channel, with circuit connections from each group of lamps to the commutating means, whereby the lamps will be lighted in successive groups representing divisions of time.

13. In an electric clock system, a source of current, commutating means and a time controller therefor, and a dial comprising a support and a plurality of radial sets of incandescent lamps mounted thereon, each radial set of lamps being divided into definite groups, with a common connection for each group, so that one group in each set when lighted would indicate a chronometric division by hours and another group when lighted in conjunction therewith would indicate a chronometric division by minutes, together with circuit connections from each group to the commutating devices, whereby current may be supplied to the lamps of each radial set as a whole, or to any group of lamps in chronometric order of minutes and hours respectively.

14. In an electric clock system, a source of current, chronometrically actuated switching means therefor, a dial with a plurality of radial sets of incandescent lamps mounted upon it, circuit connections common to all of the lamps in each set extending to the switching means, and separate circuit connections common to a portion of the lamps only in each set extending to the switching means, such that each complete set of lamps will be lighted once in the course of every hour to indicate the division of the same into minutes, and a portion of each set of lamps will be lighted once during every period of twelve hours, to indicate divisions of the same by hours.

15. In an electric clock system, a source of current, chronometrically actuated switching means therefor, a plurality of electric lamps arranged in circular order and at chronometric intervals, said lamps divided into groups, and each group subdivided into hour and minute lamps, and a plurality of sets of circuit wires extending from the lamps to the switching means, the first set of wires being common group wires from the hour lamps, and the second set being common group wires from the minute lamps, and other wires being multipled to corresponding lamps in all of the groups, said switching means being adapted to supply current through the several sets of wires in varying combinations whereby the same lamps may be lighted in groups to indicate minutes, or in other groups to indicate hours, at the proper intervals.

16. In an electric clock system, a source of current, a plurality of electric lamps with circuit connections to said source and a plurality of electromagnetically controlled step-by-step switches for said circuit connections, a moving element having a fixed time constant, adapted to supply current at intervals to the first switch, and circuit connections extending between the switches whereby succeeding switches are operated from the first.

17. In an electric clock system, a source of current, a plurality of electric lamps arranged on a support in order to designate hours and minutes, electromagnetically controlled switches appropriated to hours, minutes and seconds, respectively, circuit connections from the lamps to the source through said switches, a moving element having a fixed time constant and controlling contacts in the actuating circuit of the seconds switch, and contacts in said switch closed after a determinate number of movements thereof to close the circuit to a succeeding switch.

18. In an electric clock system, a source of current, a plurality of electric lamps arranged on a support in order to designate hours and minutes, electromagnetically controlled switches appropriated to hours, minutes and seconds, respectively, circuit connections from the lamps to the source through said switches, a moving element having a fixed time constant and controlling contacts in the actuating circuit of the seconds switch, means in the seconds switch to control contacts in the actuating circuit of a minutes switch, and means in the minutes switch to control contacts in the actuating circuit of an hours switch, whereby the progression of each set of switches is determined and regulated by the progression of the proceeding switches, and through them by the moving time element.

19. In an electric clock system, a dial carrying indicating device, arranged thereon in order of hours, minutes and seconds, a set of independently movable step-by-step switches controlling said indicating devices, said switches appropriated to the hours, minutes and seconds devices respectively, and means for producing a progressive movement of each switch and corresponding progressive operation of its indicating devices, after a number of movements of the preceding switch sufficient to produce progression of the preceding indicating devices in proper order.

20. In an electric clock system, a plurality of indicating devices relatively arranged in chronometric order, independently movable switches controlling the different indicating devices corresponding to the several divisions of time, and switch actuating means for each division adapted to produce a complete cycle of operations in its division and thereafter produce a single actuation in the next division.

21. In an electric clock system, sixty sets of indicating devices arranged in a complete cycle at intervals of one-fifth of an hour, sixty associated sets of indicating devices also arranged in a complete cycle at corresponding intervals of one minute, circuit wires extending from the hour devices, other circuit wires extending from the minute devices, a source of current, switching means adapted to connect the source through the approximate circuit wires to the several sets of minute devices at intervals of one minute, and associated switching means operated once for every twelve steps in advancement of the first means to connect the source through the proper circuit wires to the different sets of hour devices, in succession, together with separate switching means for the hour devices actuated coincidently with the switching means for the minute devices, whereby the hour devices serve a double purpose.

22. In an electric clock system, a plurality of hour indicating devices arranged in a complete cycle, and associated indicating devices in a corresponding cycle, both the hour and minute devices being divided into groups, common return wires for the devices of each group, individual return wires for all the corresponding devices in all the groups, a pair of switches for the minute devices and a similar pair of switches for the hour devices, the first switch of each pair having contacts connected to the group wires and the second switch of each wire having contacts connected to the individual return wires, means for actuating the minute switches in such order and at such intervals as to connect the group of individual wires in proper combinations to operate the minute devices in chronometric progression, and means for similarly operating the hour switches, controlled in the progression of the minute switches at proper intervals.

23. In an electric clock system, a support in the form of a dial with sixty sets of hour indicating devices arranged in circular order in a complete cycle, sixty corresponding sets of minute devices arranged in corresponding order and also in a complete cycle, five circuit wires each forming a common return for a continuous group or series of twelve indicating devices, twelve other wires each forming a return for the twelve devices occuping the same relative position in the same group, seventeen circuit wires similarly connected to the minute devices, a step-by-step switch adapted to close its contacts in cycles of five, connected to the five group wires of the hour devices, a similar switch connected to the five group wires of the minute devices, and two step-by-step switches each adapted to close its contacts in cycles of twelve, one connected to the individual wires of the minute device and the other to the individual wires of the hour devices, means to actuate the individual return minute switch one step for every minute, means controlled thereby at every cycle of twelve steps to actuate the group minute switch one step, means simultaneously actuated to advance the individual return hour switch one step, and means actuated thereby after twelve steps to actuate the group hour switch one step, whereby all the minute devices of each group are actuated in succession followed by a change to the next group, every twelve minutes this change being accompanied by an advance of one step in the hour devices, indicating a lapse of one-fifth of an hour, twelve hour devices being thus operated in each group followed by a change in the hour group, the units in which are then operated seriatim.

In testimony whereof I affix my signature in presence of two witnesses.

EDWARD E. CLEMENT.

Witnesses:
 HUGH M. STERLING,
 JAMES H. MARR.

---

Copies of this patent may be obtained for five cents each, by addressing the "Commissioner of Patents, Washington, D. C."